3,048,555
METHOD FOR STABILIZING AQUEOUS SOLUTIONS OF WATER-SOLUBLE N-VINYL HETEROCYCLIC POLYMERS AND COPOLYMERS BY ADDING WATER-SOLUBLE AMINES

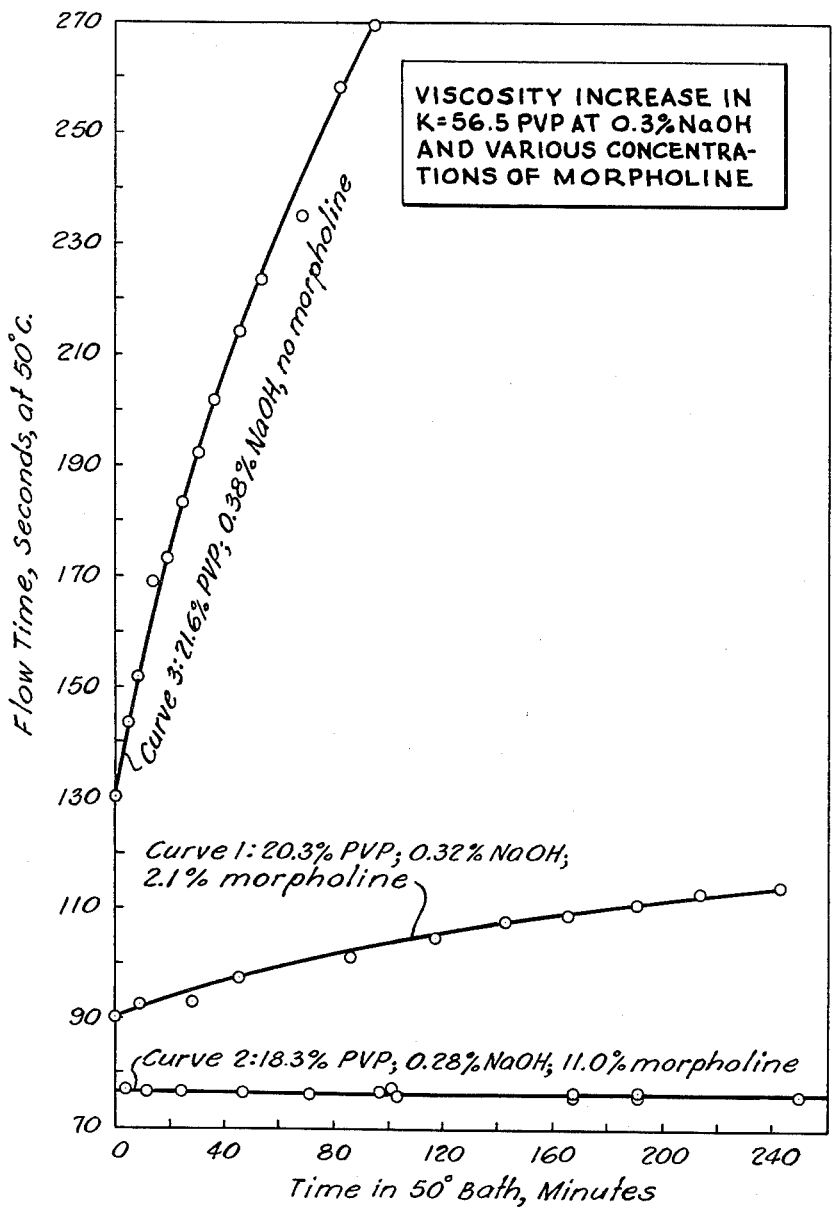

Teddy G. Traylor and John F. Voeks, Concord, Calif., assignors to The Dow Chemical Company, Midland, Mich., a corporation of Delaware
Filed Jan. 14, 1959, Ser. No. 786,845
7 Claims. (Cl. 260—29.6)

The present invention resides in the general field of organic chemistry and contributes, in particular, to the art of stabilizing certain N-vinyl heterocyclic compounds against, or materially preventing them from, cross-linking. More particularly, this invention is concerned with the stabilization against cross-linking in and consequent advantageous avoidance or substantial diminishment of undesirable gel formation with aqueous, alkaline compositions of certain water-soluble polymers of N-vinyl heterocyclic monomers, such as poly-N-vinyl-2-pyrrolidone (or, more properly, poly-N-vinyl-2-pyrrolidinone, hereinafter referred to as PVP) and the like, as subsequently more fully delineated.

Many of the water-soluble products of polymerization of N-vinyl heterocyclic monomers, such as PVP, are beneficially utilized and are finding increasing favorability for numerous applications. Frequently such water-soluble polymer products are employed or handled in the form of aqueous, alkaline solutions or dispersions, depending upon the particular compositions in which they are included.

Unfortunately, however, many of the water-soluble N-vinyl heterocyclic polymers tend to cross-link and form intolerable, irreversible gels on standing in aqueous, alkaline solution. PVP provides a well known illustration of such disadvantageous phenomenon. This typical behaviorism of the herein contemplated N-vinyl heterocyclic polymers, as is apparent, detracts markedly from their general utility in and applicability from aqueous, alkaline compositions.

The referred-to propensity of many of the water-soluble N-vinyl heterocyclic polymers to cross-link and form gels on standing in aqueous, alkaline solution may be typically represented with PVP. Normal (i.e., not cross-linked) PVP provides aqueous solutions that have viscosities ranging from slightly greater than that of water (1 centipoise @ 20° C.) to semi-solids or solids (which latter compositions are readily and characteristically reduced in viscosity by dilution), depending somewhat on the concentration of the PVP and its molecular weight (which latter property is ordinarily best expressed by means of the Fikentscher K-value of the polymer).

By way of particularization, the specific illustrations included in the following tabulations are taken directly from the bulletin entitled "PVP" which is generally available from the General Aniline & Film Corporation:

TABLE I.—EFFECT ON VISCOSITY OF RANGES OF MOLECULAR WEIGHT AND CONCENTRATION OF PVP IN AQUEOUS SOLUTION

| Concentration of PVP (percent by wt.) | Viscosity of Solution In Centistokes [a] | | | |
|---|---|---|---|---|
| | 5 | 10 | 15 | 20 |
| K-30 [b] | 3 | 8 | 16 | 35 |
| K-60 [b] | 11 | 36 | 120 | 350 |
| K-90 [b] | 35 | 220 | 1,200 | 6,500 |

[a] See remarks under following Table III.
[b] Indicated K-values correspond to number average molecular weights of the polymer of 40,000; 160,000; and 360,000, respectively.

TABLE II.—EFFECT OF TEMPERATURE ON VISCOSITY OF AQUEOUS SOLUTIONS OF PVP.[b]

| Temperature, ° C.: | Viscosity, centistokes [a] |
|---|---|
| 20 | 35 |
| 30 | 25 |
| 40 | 18 |
| 50 | 13 |

[a] See remarks under following Table III.
[b] Containing 20 wt. percent of K-30 polymer.

TABLE III.—NOTATIONS FROM "PVP" BULLETIN CONCERNING EFFECT OF SOLUTION PH ON VISCOSITY OF AQUEOUS SOLUTIONS OF PVP.

According to the referred-to "PVP" Bulletin:

"Viscosity is not appreciably changed over a wide pH range . . . (demonstrating this with data in a table that shows viscosity of 2.3–2.4 centipoise [a] for a 5% solution of K–30 PVP @ 25° C. @ pH values from 0.1 to 10). . . . Strong caustic precipitates the polymer, but the precipitate redissolves on dilution with water."

[a] In respect of viscosity measurements referred to in Tables I, II and III above:

Centistoke and centipoise units have the following simple relationship, wherein the symbols cs. and cps. represent centistokes and centipoises, respectively—

$$\text{Kinematic viscosity (cs.)} = \frac{\text{Absolute viscosity (cps.)}}{\text{density}}$$

Since the densities of the various aqueous solutions whose properties are described in the foregoing tabulations do not differ materially, the above-indicated viscosity expressions may be considered to be roughly equivalent. The viscosity ranges shown in Tables I and II are all "normal" characteristics of such aqueous PVP solutions.

As an actual matter, the statement from the referred-to "PVP" Bulletin that is duplicated in Table III is an incomplete description of the inverse solubility characteristic of PVP. For example, PVP will precipitate from a 2% sodium hydroxide (i.e., aqueous caustic) solution at 100° C. but redissolve on cooling to 50° C. The more concentrated is the aqueous base, the lower is the temperature at which the PVP will precipitate. This pattern is generally observed and follows until ultimately, in very strongly basic solutions, the precipitation of the PVP occurs at room temperatures (i.e., 20–25° C.).

The above-discussed phenomenon is reversible and not to be confused with gelation due to instability (or tendency to actually cross-link) in aqueous, alkaline solution of PVP and the like cross-linkable, water-soluble N-vinyl heterocyclic polymers contemplated herein.

When cross-linking occurs in PVP and other of the water-soluble N-vinyl heterocyclic polymers that are benefited by practice of the invention, a new species (or at least a readily distinguishable embodiment) of the polymer is formed. Amongst other oftentimes undesirable properties, the water-soluble polymers such as PVP that cross-link in aqueous, alkaline solution display an irreversible change in solution viscosity.

It is the chief aim and primary design of the present invention to provide improved and materially and substantially enhanced aqueous, alkaline solutions and the like compositions comprised of certain water-soluble, cross-linkable N-vinyl heterocyclic compounds, namely polymeric compounds such as PVP, which are stabilized against cross-linking of the water-soluble polymeric solute and have markedly, if not entitrely, reduced tendency to experience such phenomenon with consequent diminished, if not eliminated, propensity to undergo gel formation. There is comprehended in the present invention both a method for advantageously and expeditiously accomplishing the indicated end and the desirably and beneficially stabilized compositions resulting from the contemplated manipulative procedure.

According to the present invention whereby and wherein the indicated intendments may be accomplished and realized, the stability against cross-linking of aqueous, alkaline compositions, particularly solutions, of certain water-soluble, cross-linkable N-vinyl heterocyclic polymeric compounds such as PVP, as hereinafter more completely described, is greatly improved by adding to and intimately incorporating (as by dissolving) in the composition a minor proportion of a nucleophilic, amide-forming, water-soluble amine selected from the group (or mixtures thereof) of the formulae:

$$R_xNH_y \quad (A)$$

and

 (B)

wherein each R is independently (when more than one is involved) an alkyl, alkanol or aralkyl radical, $x$ is an integer from 1 to 2 and $y$ is an integer from 2 to 1 (with $x$ being 2 and $y$ having a value of 1 in a secondary amine of the form: $R_2NH$ and, conversely, $x$ having a value of 1 and $y$ being 2 in a primary amine of the structure: $RNH_2$); and Z is an aliphatic radical or an alkyl ether radical ring that is biterminally affixed to the characterizing nitrogen atom in the amine structure so that Z can be a hydrocarbon unit or can be composed of other atoms in the ring structure (completed by the nitrogen) in addition to carbon, such as oxygen, which is the case in morpholine, as depicted by the following structure:

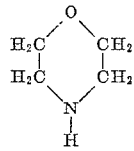

As indicaed, practice of the present invention possibilitates the provision of aqueous, alkaline solutions and the like compositions of such N-heterocyclic polymers as PVP which are substantially, if not totally, non-susceptible to becoming cross-linked and jelled upon standing, even for prolonged periods of time. As can be readily appreciated, such improvement in the stability of the polymer compositions is of great significance insofar as utilization of the water-soluble polymers for many purposes and applications is concerned. In this regard, following of the present method or utilization of the resulting compositions does not lessen the general applicability or desirable properties and characteristics for most purposes of the N-vinyl heterocyclic polymers that are treated and thereby stabilized against cross-linking in aqueous, alkaline composition. Nothing deleterious of or adversely affecting the desired properties, characteristics and capabilities of the stabilized water-soluble polymer is thereby occasioned, at least in respect of most of the uses of major interest for such products.

Thus, PVP and other of the water-soluble, cross-linkable N-vinyl heterocyclic polymers capable of being benefited for use in aqueous, alkaline compositions by practice of the present invention may generally be employed without undesirable consequence in such form (or as recovered therefrom) for such conventional and well known operations as the treatment of textiles, wherein advantage is taken or beneficial use made of the unusual dye-attracting and accepting properties of the indicated N-vinyl heterocyclic polymers for most types and varieties of dyestuffs. Typical of such operations are dye stripping; impregnation from aqueous baths of synthetic, hydrophobic textile fibers wherein the N-vinyl heterocyclic polymer is used as a dye-assisting adjuvant; and so forth. In addition, as readily appears, practice of the present invention permits storage for prolonged periods without detriment or loss of stock solutions or other compositions, however prepared, of the desired N-vinyl heterocyclic polymer products.

The stabilizing, cross-link-preventing amines that are used in preparing the compositions of the present invention may be added directly (with mixing, if necessary or desirable in certain cases) to the aqueous, alkaline composition, such as a solution, of the N-vinyl heterocyclic polymer being stabilized. Or, alternatively, the compositions may be prepared by adding the water-soluble polymer to an aqueous solution of the amine, either before or after the alkalinity of the composition is adjusted to a desired level.

The water-soluble, cross-linkable N-vinyl heterocyclic polymer solutes that are benefited by the present practice may advantageously be polymers, having the indicated characteristics, of N-vinyl lactams or N-vinyl-3-morpholinones. Of course, compositions comprising mixtures of the various N-vinyl heterocyclic polymers may also be stabilized with obvious advantages in the instances when such formulations are desired or involved.

The N-vinyl lactam polymers may be any of those which are variously characterized, like PVP, as poly-N-vinyl lactams or poly-1-vinyl lactams. Such polymers as have been described or which may be prepared from the mentioned varieties of monomers that are involved in United States Letters Patent Nos. 2,265,450; 2,371,804; and 2,335,454 may be suitably treated in the practice of the invention. Besides PVP, such poly-N-vinyl lactams as poly-N-vinyl-5-methyl-2-pyrrolidone (PVP-M); poly-N-vinyl piperidone (PVPp); poly-N-vinyl caprolactam (PVCp); and the N-vinyl lactam polymers which are generically included within the structural formula:

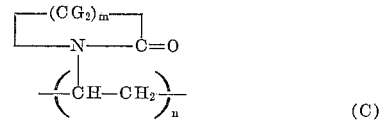 (C)

wherein each G is independently selected from the group consisting of hydrogen and methyl; $m$ is an integer from 3 to 5; and $n$ is a plural integer of considerable magnitude, generally adequate to provide the polymer product with a K-value of at least 5 or 10 to 100 and more.

The N-vinyl-3-morpholinone polymers employed are of the general structure:

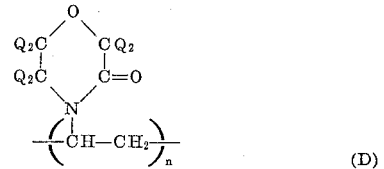 (D)

wherein each Q is independently selected from the group consisting of hydrogen and methyl; and $n$ has a value as defined in connection with Formula C. Advantageously, an N-vinyl-3-morpholinone polymer without ring substitution on the cyclic carbon atoms other than hydrogen is utilized, as is obtained when each Q in Formula D is hydrogen. This is PVM.

If desired, water-soluble copolymers of any two or more of the types of recurring units set forth and read upon by Formulae C and D may be employed in the practice of the invention. Likewise, if desired, the N-vinyl heterocyclic polymer stabilized may be a copolymer that contains at least about 50 wt. percent of one or more of the recurring units of Formulae C and/or D, with any balance being another polymerized recurring unit derived from another monoethylenically unsaturated monomer that is copolymerizable with the monomeric precursors of said N-vinyl heterocyclic polymers to form and provide water-soluble, cross-linkable polymer products of the general type and variety herein contemplated. It is usually desirable, when such copolymers are employed, for at least about 80 wt. percent of the indicated recurring units of the mentioned N-vinyl heterocyclic polymers to be present.

The substituents represented by the symbol R in the amine stabilizers of the Formula A may advantageously be alkyl radicals that contain from 1 to about 10 carbon atoms; monohydric alkanol radicals that contain from 1 to about 10 carbon atoms with, beneficially, a terminally attached hydroxy group therein; and hydrocarbon aralkyl radicals that contain from 7 to about 15 carbon atoms, including carbon atoms in substituents on either the aryl or aliphatic portion of the radical. The alicyclic units represented by the symbol Z in Formula B may contain from 3 to about 6 carbon atoms in the ring structure and may involve systems containing a total of as many as 10 or so carbon atoms, including the carbons in any ring substituents that may be present in the system. Heteroalicyclic systems containing an oxygen or a sulfur atom in the ring system in addition to the carbon atoms (as well, of course, as the completing nitrogen) therein present may also be utilized for the unit Z in the amines of Formula B.

Typical of the secondary amines that may be employed in the practice of the invention and falling within the scope of the Formula A are dimethylamine; diethylamine; di-isopropylamine; dibutylamine; diamylamine; methylethylamine; 2-methylaminoethanol (i.e., $$CH_3—NH—CH_2CH_2OH$$

and so forth.

Illustrative of the primary amines of Formula (A) are methylamine; n-butylamine; hexylamine; heptylamine; alpha-methylbenzylamine

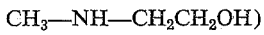

and so forth.

Pyrrolidine

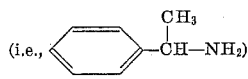

and piperidine

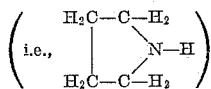

are typically illustrative of satisfactory alicyclic amines of the Formula B suitable for use in the practice of the invention, while, as indicated, morpholine may advantageously be utilized as an heteroalicyclic amine of the Formula B for the stabilization against cross-linking of aqueous, alkaline solutions or the like of the herein contemplated N-vinyl heterocyclic polymer compounds.

There is no practical limitation on the characteristics of the aqueous, alkaline solutions or the like compositions (as regards concentration of the polymer contained therein) that are stabilized in the practice of the present invention. Solutions of the N-vinyl heterocyclic polymers, such as PVP, are commonly prepared for many commercial and other applications having dissolved polymer concentrations of from as little as 0.1 wt. percent to as much as 50 wt. percent or thereabouts. Any such composition may advantageously be improved and ameliorated by means of following of the presently contemplated procedure.

Likewise, although polymer in any available molecular weight (or K-value) range may be benefited, the polymers of more widespread interest are frequently found to have a K-value between about 30 and 90. This is oftentimes the case with PVP, as it also is with poly-N-vinyl-3-morpholinone (PVM) and other of the above-discussed N-vinyl lactam and N-vinyl-3-morpholinone polymer compounds.

As little as about 1% amine, based on the weight of the N-vinyl heterocyclic polymer in the aqueous, alkaline composition being stabilized, brings about a decidedly (and oftentimes completely satisfactory) beneficial effect. On the other hand, the use of greater proportions of the amine, such as amounts up to about 60 wt. percent or so, based on the weight of polymer being stabilized, generally results in complete elimination of cross-linking of the N-vinyl heterocyclic polymer and entire avoidance of the tendency of the aqueous, alkaline composition to gel. It is usually more advantageous for an amount of the amine to be employed that is between about 5 and about 20 wt. percent of the quantity of the N-heterocyclic polymer in the composition being stabilized.

The invention is further illustrated, and its many advantages and benefits made specifically manifest, in and by the following exemplary demonstrations which are intended to be taken as merely docent and not restrictive or limiting of the invention, wherein all percentages are to be understood as being by weight.

*First Demonstration*

A mixture of 50 ml. of 30% aq. K-49 PVP, 10 ml. water, 2 ml. 50% aq. caustic (i.e., sodium hydroxide) and 3 ml. morpholine was prepared by simple addition of the ingredients to a suitable glass vessel.

The resulting solution contained 23% PVP, 1.5% caustic (calculated as solid NaOH) and 4.6% of the morpholine (20% on the weight of the PVP in the composition).

The morpholine-containing solution was then heated at 100° C. for 2 hrs. No gel formation occurred and no trace of gelation could be observed in the composition after the heating.

In contrast, a similar PVP solution made the same way excepting to eliminate the morpholine set up into solid gel within 2 hrs. when heated at 100° C.

*Second Demonstration*

A number of aq. 20% PVP (K-56.5) solutions were prepared, each containing 0.3% caustic (calculated as solid NaOH.). Various amounts of morpholine were added to the respective solutions.

The solutions were then placed in a viscometer-reactor of conventional type and maintained therein at about 50° C., with the flow time of each solution tested being measured at various intervals.

The results were as indicated by the data graphically portrayed in the several curves set forth in the sole FIGURE of the hereto-annexed drawing.

In curve 1 there is shown the behavior and substantial resistance to gelation of the solution to which there was added 2.1% morpholine, based on the total solution weight (i.e., 10.3% morpholine on the weight of the PVP in solution), as a stabilizer. This solution exhibited significant resistance to viscosity increase under the conditions of testing.

Still higher levels of morpholine were observed to entirely prevent viscosity change and totally resist gelation and cross-linking of the PVP solution. This is evidenced nicely by curve 2, which depicts the data and results obtained with the solution containing 11.0% morpholine (i.e., 60% on the PVP).

In contrast, curve 3 indicates the behavior of the blank or control solution of the PVP which was exposed and tested in the same manner but without having any amine added thereto.

All of the viscosity measurements made in the accumulation of the data included in curves 1, 2 and 3 were taken upon observation of the flow time of a given volume of the solution being tested through a standard size orifice. A direct record for comparison of viscosity changes in the systems under study was thus afforded by means of use of the expression:

$$\eta = \overline{K} dt$$

wherein $\overline{K}$ is a system characteristic constant, $d$ is density in gm./cc., $t$ is time of flow in seconds and $\eta$ is absolute viscosity in centistokes.

*Third Demonstration*

A 20% aq. PVP (K-51) solution was prepared with

2% solid NaOH (on total weight of solution) being included therein.

Four separate 25 ml. aliquot samples of the stock solution were then taken and separately treated as follow:

| Sample | Treated By Addition Of— |
|---|---|
| "W" | 2 ml. n-butylamine. |
| "X" | 2 ml. alpha-methlybenzylamine. |
| "Y" | 2 ml. 2-methylaminoethanol. |
| "O" | nothing (i.e., control blank). |

Stoppered test tubes containing each sample were then heated on a steam bath @ 100° C. for 30 minutes. The presence of the caustic (and the amine in the cases wherein one was included) in each of the samples caused a reversible precipitation of the PVP due to its inverse solubility property.

When the samples were then subsequently added to excess individual quantities of water, the precipitated PVP in samples "W," "X" and "Y" was found to be readily and completely soluble. The polymer in sample "O," however, remained a tough, insoluble gel.

*Fourth Demonstration*

When the foregoing procedures are duplicated with similar aqueous, alkaline solutions of PVP excepting to employ, as the amine stabilizing additiment, either diethylamine, dibutylamine, pyrrolidine, piperidine or hexylamine, similar excellent beneficial results are obtained.

Likewise, commensurate good results are obtained when the foregoing procedures are duplicated excepting to employ PVM, PVP-M, PVPp or PVCp as the N-vinyl heterocyclic polymer that is stabilized.

From the foregoing, it is apparent that the present invention is of particular benefit when the N-vinyl heterocyclic polymer is contained in an aqueous composition of considerable alkalinity. This is of pronounced and apparent value since cross-linking and tendency to gel generally commence in such compositions at about pH 9 and increases in severity and rapidity as the alkalinity of the composition (particularly solutions) is increased therebeyond.

What is claimed is:

1. Method for the stabilization against cross-linking and gel formation of aqueous, alkaline solutions of water-soluble, cross-linkable N-vinyl heterocyclic polymers, which method comprises adding to and incorporating in (a) an aqueous, alkaline solution of a water-soluble polymer containing at least about 50 weight percent of recurring N-vinyl heterocyclic units selected from the group consisting of those, and their mixtures, of the formulae:

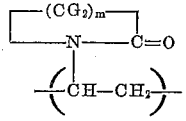

(C)

and

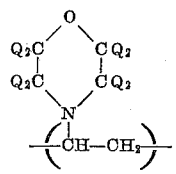

(D)

wherein both G and Q are each selected independently from the group consisting of hydrogen and methyl and $m$ is an integer from 3 to 5, and up to 50 weight percent of another polymerized recurring unit of another monoethylenically unsaturated monomeric material that is copolymerizable with the monomeric precursors of said N-vinyl heterocyclic polymers; a (b) minor proportion of at least one nucleophilic, amide-forming, water-soluble amine selected from the group consisting of those of the formulae:

and

wherein each R is independently selected from the group consisting of alkyl radicals containing from 1 to about 10 carbon atoms, monohydric alkanol radicals containing from 1 to about 10 carbon atoms, and aralkyl radicals containing from 7 to about 15 carbon atoms; $x$ is an integer from 1 to 2 and $y$ is an integer from 1 to 2 with the limitation that when $x$ is 1, $y$ is 2 and when $x$ is 2, $y$ is 1; and Z is a radical selected from the group consisting of a bivalent 3 to 10 carbon atom alkylene radical biterminally affixed to the nitrogen atom and of which not more than 6 carbon atoms are in the ring formed with the nitrogen atom, and a bivalent radical from a 3 to 10 carbon atom alkyl ether obtained by removing the terminal hydrogens therefrom, which radical is biterminally affixed to the nitrogen atom and of which not more than 6 carbon atoms are in the ring formed with the nitrogen atom.

2. The method of claim 1, wherein between about 1 and about 60 weight percent of said amine, based on the weight of the N-vinyl heterocyclic polymer in solution, is added to said solution.

3. The method of claim 1, wherein between about 5 and about 20 weight percent of said amine, based on the weight of the N-vinyl heterocyclic polymer in solution, is added to said solution.

4. The method of claim 1, wherein said N-vinyl heterocyclic polymer is poly-N-vinyl-2-pyrrolidinone.

5. The method of claim 1, wherein said N-vinyl heterocyclic polymer is poly-N-vinyl caprolactam.

6. The method of claim 1, wherein said N-vinyl heterocyclic polymer is poly-N-vinyl-3-morpholinone.

7. The method of claim 1, wherein said amine is morpholine.

References Cited in the file of this patent
UNITED STATES PATENTS 2,646,416    Parker _____ July 21, 1953
2,793,980    Mamlok _____ May 28, 1957

OTHER REFERENCES

Kline: "Modern Plastics," November 1945, pages 157–159.